(12) United States Patent
Bronner et al.

(10) Patent No.: US 6,203,712 B1
(45) Date of Patent: Mar. 20, 2001

(54) PROCESS FOR SEPARATION BY SETTLING IN A PLURALITY OF DISTINCT ZONES

(75) Inventors: Charles Bronner, Irigny; Alain Forestiere; François Hugues, both of Vernaison, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/229,578

(22) Filed: Jan. 13, 1999

(30) Foreign Application Priority Data

Jan. 14, 1998 (FR) .................................................. 9800398

(51) Int. Cl.⁷ .................................................. B01D 21/30
(52) U.S. Cl. ..................... 210/740; 210/800; 210/805; 585/250; 585/502; 585/709
(58) Field of Search ..................... 210/740, 749, 210/800, 801, 804, 805, 806; 585/802, 921, 922, 250, 502, 504, 701, 709

(56) References Cited

U.S. PATENT DOCUMENTS

| | | | |
|---|---|---|---|
| 3,825,494 | 7/1974 | Call et al. | 210/138 |
| 3,856,677 | 12/1974 | Peters et al. | 210/96 |
| 4,017,263 | * 4/1977 | Holmes et al. | 585/802 |
| 4,072,730 | * 2/1978 | Winter . | |
| 4,093,795 | * 6/1978 | Buechner et al. . | |
| 4,348,544 | 9/1982 | Davis et al. | 585/300 |
| 5,759,937 | * 6/1998 | Hovis et al. | 585/802 |

FOREIGN PATENT DOCUMENTS

| | | |
|---|---|---|
| 195 38 820 | 4/1997 | (DE) . |
| 0 680 941 | 8/1995 | (EP) . |
| 0 752 401 | 8/1997 | (EP) . |
| 2 611 700 | 9/1988 | (FR) . |
| 2 732 011 | 9/1996 | (FR) . |

* cited by examiner

Primary Examiner—Joseph W. Drodge
(74) Attorney, Agent, or Firm—Millen, White, Zelano & Branigan, P.C.

(57) ABSTRACT

A process for separating at least two liquid phases which are at least partially non miscible is characterized in that after reacting, a polyphase effluent is settled in at least two distinct settling zones arranged in parallel, each of these settling zones containing at least one settler. The feed to be treated is sent to reactor R via a means for circulating fluids P via line 1. The effluent leaves the reactor via line 2 and is separated into two fractions. One fraction is sent to a settling zone a) via line 3; the other fraction is sent to a settling zone b) via line 4. The heavy phase from settling zone a) is sent to the reactor via line 7 and the heavy phase of the settling zone b) is sent to the reactor via line 6. The light phase from settling zone a) is sent to line 8, and rejoins fresh feed supply line 1. The light phase from settling zone b) is evacuated from the circuit via line 5.

20 Claims, 1 Drawing Sheet

PROCESS FOR SEPARATION BY SETTLING IN A PLURALITY OF DISTINCT ZONES

Figure 1:
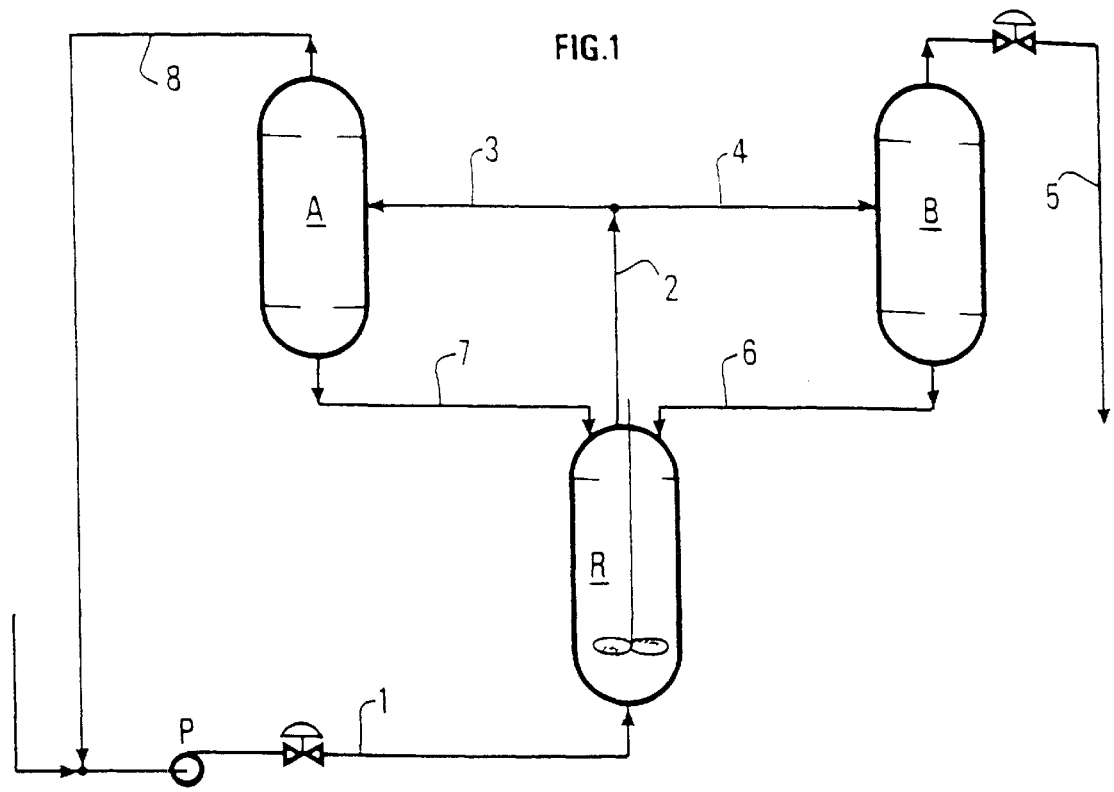

The present invention relates to polyphase liquid mixtures in which the phases are at least partially non miscible. More particularly, the invention relates to separating the different phases of such a mixture.

Separating at least two liquid phases which are at least partially non miscible is usually carried out by settling. The mixture is sent to a vessel termed a settler where separation takes place under gravity. Phases with different densities separate out, and the different phases form layers which are superimposed in order of density. The most dense phase, i.e., the heaviest phase, occupies the bottom of the settler; the least dense phase, i.e., the lightest phase, is located above the other phases in the upper portion of the settler. Clear phase separation is often observed. In practice, two-phase liquid-liquid mixtures are usually treated.

In the present description, the abbreviation "$\mu$m" is used for "micrometer", i.e., $10^{-6}$ meters.

Depending on the settler used, settling can be more or less efficient. In the least efficient settlers, large droplets of one phase will be permitted in a given phase. The term "large droplets" means droplets with a diameter of about 100 $\mu$m to $10^{-3}$ m. In the most efficient settling steps, the maximum diameter of the droplets of another phase in a given phase is about 50 $\mu$m to 200 $\mu$m. This thus defines a specification for the size of droplets which will be permitted.

The present invention provides a process for separating at least two liquid phases which are at least partially non miscible, characterized in that after reacting, a polyphase effluent is settled in at least two distinct settling zones arranged in parallel, each of these settling zones containing at least one settler.

The present invention also provides an apparatus for carrying out the separation process.

The advantages of the present invention over the prior art include the fact that this process enables smaller settlers to be used, and these settlers are thus easier to use and take up a smaller ground surface area. Thus if the specifications for size of droplets obtained with two settlers each 1 m in diameter are to be reproduced in a single settler—the sum of the inlet and outlet flow rates otherwise being equal in the two embodiments—, it would be necessary to use a settler with a diameter of about three times that of the settlers used in the process of the invention. Further, when fluids are treated under pressure, the larger the settler size, the thicker the settler wall has to be, and thus material is saved when several smaller settlers rather than a single large settler are used. Further, for the reactions to which the process of the invention can be applied and where cooling using an external and/or internal coil is not efficient, sufficient cooling is obtained by re-circulating the light phase from at least one settling zone.

The present invention provides a process for separating liquid phases which are at least partially non miscible of a polyphase reaction effluent in at least two distinct settling zones arranged in parallel, each of the settling zones containing at least one settler, preferably each settling zone comprising a single settler.

The two phases are separated in at least two distinct settling zones a) and b) arranged in parallel. A number of implementations of the invention are possible: in one particular implementation, the light phase from settling zone a) is recycled to the reaction zone after settling, and the light phase from settling zone b) is evacuated.

In a further implementation of the invention, the heavy phase from at least one settler is recycled to the reaction zone after settling.

In a preferred implementation of the process of the invention, the light fraction from settling zone a) is recycled to the reaction zone after settling, the light fraction from settling zone b) is evacuated and the heavy phases from the settlers are recycled to the reaction zone.

The separation process of the invention can be applied to any chemical reaction where the effluent is a polyphase mixture at the reactor outlet. Frequently, one of the phases, generally the densest phase, contains a liquid catalytic composition. This reaction can, for example, be a reaction which is catalysed by a liquid catalytic composition with an ionic nature which is slightly or non miscible with an organic phase.

The separation process of the invention can, for example, be applied to reactions in which the effluent is a two-phase liquid-liquid type effluent such as, for example, oligomerisation, hydroformylation or hydrogenation reactions, in particular oligomerisation, hydroformylation or hydrogenation of olefins; the process is also applicable to alkylation reactions, in particular aliphatic alkylation.

In the process of the invention, the polyphase effluent is sent to at least two settling zones after reacting. In a preferred embodiment of the invention, the effluent enters the settler in a direction which is approximately horizontal and approximately tangential to the arc of the circle described by the settler wall. This thus produces a vertical effluent velocity of almost zero. In each settler of these settling zones, the temperature and pressure conditions are preferably the same as the temperature and pressure conditions inside the reactor. Further, the dimensions of these settlers are selected depending on the degree of settling which is desired at the given inlet and outlet effluent flow rates. Thus a maximum diameter for droplets of another phase which is permitted in a given phase is selected. After settling, the settled liquids are extracted, the phase containing the desired products from settling zone a) is recycled to the reaction zone and the phase containing the desired products from settling zone b) is recovered.

In continuous mode, the light phase is recovered using an effluent recovery means placed in the highest portion of the settler; simultaneously the heavy phase is recovered by an effluent recovery means placed in the lower portion of the settler. The scope of the present invention encompasses treating a polyphase mixture containing three or more phases in which each phase is of a different density. After settling, as many superimposed layers of liquid are obtained as there are phases. Each phase is then extracted from the settler by an effluent recovery means placed in the portion of the settler corresponding to the level of that phase.

The settling process can particularly be applied to separating constituents of the effluent from a catalysed olefin oligomerisation reaction in a two-phase liquid-liquid medium. The catalytic composition used in this type of process is dissolved in a polar phase which is not miscible with the organic phase.

Descriptions of the prior art concerning homogeneous oligomerisation processes carried out in a two-phase liquid-liquid medium propose the use of different types of catalysts depending on the olefins to be treated and on the product which is selected; such catalysts all contain at least one metal compound, preferably a nickel compound, and an alkylaluminium halide. The medium with an ionic nature comprises at least one salt with formula $Q^+A^-$, where $Q^+$ is normally a quaternary ammonium or phosphonium cation or a mixture of the two, or a lithium cation, and $A^-$ is a co-ordinating or non co-ordinating anion normally selected from the group formed by halogenoaluminates, organohalogenoaluminates, organogallates, organohalogenogallates or a mixture of at least two of those compounds. The reaction temperature is about −40° C. to +100° C., the pressure is such that the reactants are at least partially, preferably mainly in the liquid phase and the stirring conditions are those required to convert at least a portion of the feed. Examples of olefins which can be treated by such a process are olefins containing 2 to 8 carbon atoms per molecule. Examples are ethylene, propylene, 1- and 2-butenes, styrene, pentenes or mixtures of those compounds.

Applying the process of the invention to oligomerising olefins has the following particular advantages: re-circulation of at least a portion of the light phase of the effluent enables a cooling element to be inserted into the re-circulation circuit, and a portion of the heat produced by the exothermic oligomerisation reaction can thus be evacuated. Further, settling prior to re-circulating this light phase eliminates a maximum quantity of heavy phase droplets which, if such settling were not to be provided, could become deposited in different parts of the apparatus during re-circulation: piping, pumps, exchangers.

After the reaction, the phases are separated by settling the mixture. The effluent is sent to at least two distinct separation zones arranged in parallel. After settling in zone b) where efficient settling is carried out, the upper phase which comprises the desired dimers, co-dimers and oligomers is extracted and this phase is evacuated from the apparatus. In settling zone a) where cruder settling is permitted, the upper phase, which comprises dimers, co-dimers and oligomers, is extracted and this phase is re-circulated. Thus at the outlet from settling zone b) where the effluent is evacuated from the apparatus, only small droplets of heavy phase will be permitted in the light phase; usually, a maximum heavy phase droplet diameter of about 50 $\mu$m to 200 $\mu$m is selected, preferably 55 $\mu$m to 100 $\mu$m; the flow rate for incoming feed to be treated in this type of settler is about 1 m$^3$/h to 30 m$^3$/h, preferably 5 m$^3$/h to 20 m$^3$/h.

At the outlet from settling zone a) where the effluent is recycled, large droplets of heavy phase are permitted in the light phase, these droplets being treated once again. Thus, the maximum droplet diameter is about 100 $\mu$m to 10$^{-3}$ m, preferably 200 $\mu$m to 500 $\mu$m; the flow rate for incoming feed to be treated in this type of settler is about 10 m$^3$/h to 100 m$^3$/h, preferably 25 m$^3$/h to 50 m$^3$/h. This light phase from zone a) then supplies the line for adding fresh feed, and the mixture composed of the light phase from zone a) and fresh feed is cooled in a cooling means, for example a heat exchanger, before being introduced into the reactor.

The most dense phases of the settler contents are re-introduced into the reactor. Depending on the envisaged reaction, they can be introduced into the reactor without any intermediate treatment, and they can also undergo an intermediate treatment such as cooling or heating. In a preferred implementation of the invention, at least a portion of the liquid catalytic composition contained in one of the phases is regenerated before being re-introduced into the reactor: a portion of the liquid catalytic composition sent to the reactor is removed and it is replaced by the same quantity of fresh liquid catalytic composition. This operation is usually carried out on the heavy phase from settling zone a).

In the majority of reactions to which the process of the present invention applies, it may be important to monitor the quantity of heavy phase present in the apparatus. The heavy phase generally contains the catalytic composition required for the reaction; however, a portion of that catalytic composition is evacuated from the apparatus in the form of droplets entrained in the light phase. After a number of hours of operation, the quantity of heavy phase entrained in the light phase may not be negligible.

The quantity of heavy phase can be monitored continuously or discontinuously.

Continuous monitoring is accomplished by observing the variation in the weight of the reactors in the reaction zone over the entire reaction period using any weighing means, for example using a weight indicator. If the weight has changed, more heavy phase is added.

Discontinuous monitoring is accomplished as follows: after closing the evacuation lines from one settler in the apparatus, preferably a settler in zone a), the whole of the heavy phase is drawn into that settler. The heavy phase is checked visually, for example by observing the ice line, and if necessary, a quantity of heavy phase equal to the missing quantity of heavy phase is added, then the heavy phase evacuation line from that settler is opened to restart the apparatus.

The present invention also concerns an apparatus for carrying out the process, characterized in that it comprises at least one line for supplying feed to be treated to a reaction zone, at least one line for evacuating effluent from the reaction zone which separates into as many lines as there are settling zones, and at least one line for evacuating each phase contained in each reactor. In one particular embodiment of the apparatus of the invention, at least one of the light phases is recycled to the reaction zone. In a further embodiment of the apparatus of the invention, at least one of the dense phases is supplied to the reaction zone.

FIG. 1 shows a simple embodiment of the process of the invention where settling is carried out on a two-phase mixture in two settling zones each containing a settler. The feed to be treated is sent to a reactor R via a means for circulating fluids P via a line 1. The effluent leaves the reactor via a line 2 then it is separated into two fractions. One fraction is sent via a line 3 to a settling zone a) containing a single settler, the other fraction is sent via a line 4 to a settling zone b) containing a single settler. The heavy phase of settling zone a) is sent to the reactor via a line 7 and the heavy phase from settling zone b) is sent to the reactor via a line 6. The light phase from settling zone a) is sent to a line 8 which supplies line 1 supplying fresh feed to the reactor. The light phase from settling zone b) is evacuated from the apparatus via a line 5.

Figure 2:
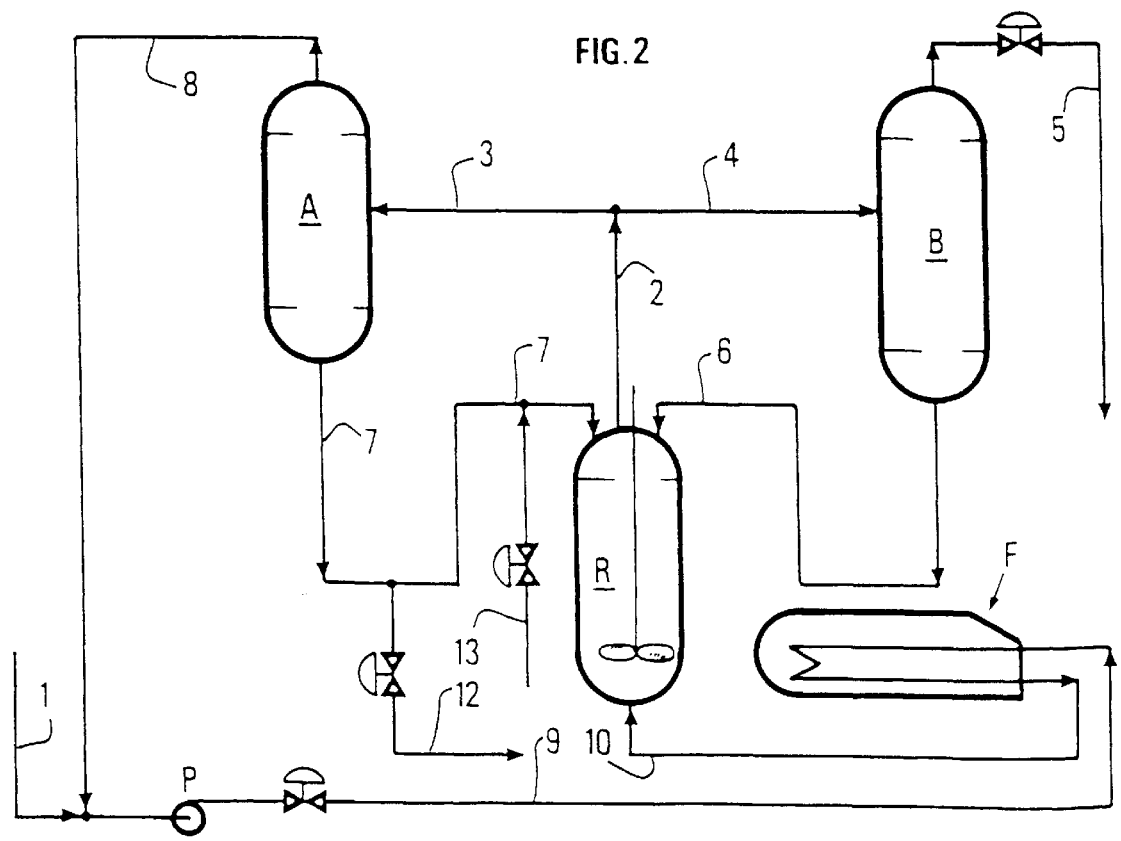

FIG. 2 shows a further embodiment of the process of the invention in which a two-phase mixture is settled in two settling zones each containing a settler and where at least a portion of the dense phase from settling zone a) is regenerated. The feed to be treated is supplied to the apparatus via a line 1, and circulated by a means P for circulating fluids. It leaves via a line 9 and is then introduced into a cooling means F; line 9 is provided with a valve. The cooled feed is sent to a reactor R via a line 10. The effluent leaves the reactor via a line 2 and is then separated into two fractions. One fraction is sent to settling zone a) via a line 3; the other fraction is sent to settling zone b) via a line 4. The heavy phase from settling zone a) is sent to the reactor via line 7 and the heavy phase from settling zone b) is sent to the reactor via a line 6. The effluent which circulates in line 7 is evacuated via a line 12, and a feed is supplied to line 7 via a line 13. Lines 12 and 13 are provided with valves. The light phase from settling zone a) is sent to line 8, and rejoins fresh feed supply line 1. The light phase from settling zone b) is evacuated from the apparatus via line 5.

EXAMPLES

The following examples illustrate the invention without in any way limiting its scope.

Example 1
In Accordance with the Invention

An apparatus corresponding to FIG. 2 was used in this Example.

A total feed entering reactor R at a flow rate of 1008 kg/h including olefins containing 4 carbon atoms, 60% by weight of which were butenes and 40% by weight of which were n-butane, was converted into oligomers in a reactor operating in a two-phase liquid-liquid mode. The temperature of the feed entering the reactor was 5° C. The reactor contained 40 kg of a catalytic composition in the form of a polar liquid phase containing: 19.6 kg of aluminium chloride, 18.3 kg of butylmethylimidazolium chloride and 2.1 kg of nickel chloride. This catalytic composition was dispersed in the phase containing the olefins and catalysed the oligomerisation reaction. The operating conditions of the reaction were: a temperature of 10° C. and a pressure equal to atmospheric pressure. After reacting, the effluent was sent to two reactors with a diameter of 150 mm and a height of 450 mm arranged in parallel.

The flow rate of the stream entering settling zone a) was 1087 kg/h; the flow rate of the stream entering settling zone b) was 122 kg/h.

In settling zone a), settling eliminated droplets of catalyst with a diameter of over 200 μm in the light phase containing the olefins, this phase also containing n-butane which did not react. The flow rate of this light phase was 906 kg/h and was re-circulated then added to the fresh feed. The mixture constituted by light phase and fresh feed was cooled to 5° C. using a heat exchanger then introduced into the reactor once more. The heavy phase from settling zone a) was sent to the reactor at a flow rate of 181 kg/h after undergoing intermediate treatment. This treatment consisted of continuously extracting 40 g/h of used catalytic composition and injecting the same quantity of the same fresh catalytic composition. The residence time for the catalytic composition in the reactor was thus 1000 hours.

In settling zone b), settling eliminated catalyst droplets with a diameter of over 55 μm from the light phase containing the olefins. This light phase was evacuated from the apparatus at a rate of 102 kg/h. The heavy phase from settling zone b) was sent directly to the reactor at a rate of 20 kg/h.

In the light phase, the octene yield was 82%.

Example 2
Not in Accordance with the Invention

A total feed with a flow rate of 1008 kg/h including olefins containing 4 carbon atoms, 60% by weight of which were butenes and 40% by weight of which were n-butane, was converted into oligomers in a reactor operating in a two-phase liquid-liquid mode. The reactor contained 40 kg of a catalytic composition in the form of a polar liquid phase containing: 19.6 kg of aluminium chloride, 18.3 kg of butylmethylimidazolium chloride and 2.1 kg of nickel chloride.

This catalytic composition was dispersed in the phase containing the olefins and catalysed the oligomerisation reaction. After reacting, the effluent was sent to one reactor with a diameter of 450 mm and a height of 450 mm.

Settling eliminated droplets of catalytic composition with a diameter of over 55 μm from the light phase containing the olefins; this phase also containing n-butane which did not react. This light phase was re-circulated at a rate of 906 kg/h then added to fresh feed. The mixture, constituted by light phase and fresh feed, was cooled to 5° C. using a heat exchanger then introduced into the reactor once more. 102 kg/h of this light phase was evacuated from the apparatus via line 5. The heavy phase from the settler was sent to the reactor at a flow rate of 201 kg/h after undergoing intermediate treatment. This treatment consisted of continuously extracting 40 g/h of used catalytic composition and injecting the same quantity of the same fresh catalytic composition.

In the light phase, the octene yield was 82%.

Thus to obtain an outlet effluent with the same specifications as that of Example 1, i.e., elimination of catalytic composition droplets with a diameter of over 55 μm from the light phase with a single settler, a settler with a diameter three times that of Example 1 was required.

With a single settler, the ground surface area taken up was 1590 cm$^2$; with two settlers, the surface area was only 353 cm$^2$.

What is claimed is:

1. A process for separating at least two liquid phases which are at least partially non miscible comprising
withdrawing from a reaction zone, a polyphase effluent comprising a lightest phase and a most dense phase, wherein the polyphase effluent is a reaction product from one of the following liquid-liquid two-phase reactions containing a liquid catalytic composition: oligomerisation, hydrogenation, hydroformylation and alkylation,
and settling said effluent in at least two distinct settling zones arranged in parallel which are configured and/or operated to give different degrees of settling, each of these settling zones containing at least one settler.

2. A separation process according to claim 1, wherein the settling step is carried out:
in at least one settling zone a) in which the lightest phase is recycled to the reaction zone after settling;
and in at least one settling zone b) arranged in parallel to zone a) and in which the lightest phase is recovered after settling and is not recycled to the reaction zone.

3. A separation process according to claim 2, wherein the characteristics of settling zone a) are as follows: the flow rate of the mixture entering settling zone a) is about 10 to 100 m$^3$/h; and the diameter of the droplets of one phase permitted in another phase is 100×10$^{-6}$ m to 10$^{-3}$ m.

4. A separation process according to claim 3, further comprising withdrawing an effluent from said at least one settling zone b), said effluent comprising the lightest phase, said effluent containing droplets of said most dense phase, said droplets having a maximum diameter of about 50 microns to 200 microns.

5. A separation process according to claim 4, wherein the diameter of the droplets is 55 microns to 100 microns.

6. A separation process according to claim 3, wherein each settling zone consists of a single settler.

7. A separation process according to claim 2, wherein the characteristics of settling zone b) are as follows: the flow rate of the mixture entering settling zone b) is about 1 to 30 m$^3$/h; and the diameter of droplets of one phase permitted in another phase is about 50×10$^{-6}$ m to 200×10$^{-6}$ m.

8. A separation process according to claim 7, wherein each settling zone consists of a single settler.

9. A separation process according to claim 2, further comprising withdrawing an effluent from said at least one settling zone b), said effluent comprising the lightest phase, said effluent containing droplets of said most dense phase, said droplets having a maximum diameter of about 50 microns to 200 microns.

10. A separation process according to claim 9, wherein the diameter of the droplets is 55 microns to 100 microns.

11. A separation process according to claim 2, wherein the reaction is oligomerisation of olefins containing 2 to 8 carbon atoms per molecule.

12. A separation process according to claim 1, wherein at least a portion of the most dense phase of at least one settler is sent to the reaction zone.

13. A separation process according to claim 12, wherein the reaction is oligomerisation of olefins containing 2 to 8 carbon atoms per molecule.

14. A separation process according to claim 1, wherein each settling zone consists of a single settler.

15. A separation process according to claim 1, wherein one of the phases contains at least one liquid catalytic composition.

16. A separation process according to claim 1, further comprising
    extracting the dense phase of at least one settling zone, wherein the dense phase essentially comprises a liquid catalytic composition,
    evacuating a portion of said liquid catalytic composition from the dense phase and replacing the evacuated portion with a same quantity of fresh catalytic composition,
    re-introducing the dense phase into the reaction zone.

17. A separation process according to claim 16, wherein the reaction is oligomerisation of olefins containing 2 to 8 carbon atoms per molecule.

18. A process according to claim 1, wherein the lightest phase is withdrawn from above a heavy phase, and further comprising continuously monitoring the total quantity of the heavy phase by inspecting the variation in the weight of a reactor for said two-phase reaction throughout the reaction period.

19. A process according to claim 1, wherein the lightest phase is withdrawn from above a heavy phase, and further comprising discontinuously monitoring the total quantity of the heavy phase by inspecting the variation in the weight of a reactor for said two-phase reaction throughout the reaction period.

20. A separation process according to claim 1, wherein the reaction is oligomerisation of olefins containing 2 to 8 carbon atoms per molecule.

\* \* \* \* \*